April 9, 1968
G. M. HALL
3,377,140
APPARATUS FOR CATALYTICALLY DECOMPOSING HYDRAZINE
Filed Oct. 15, 1965
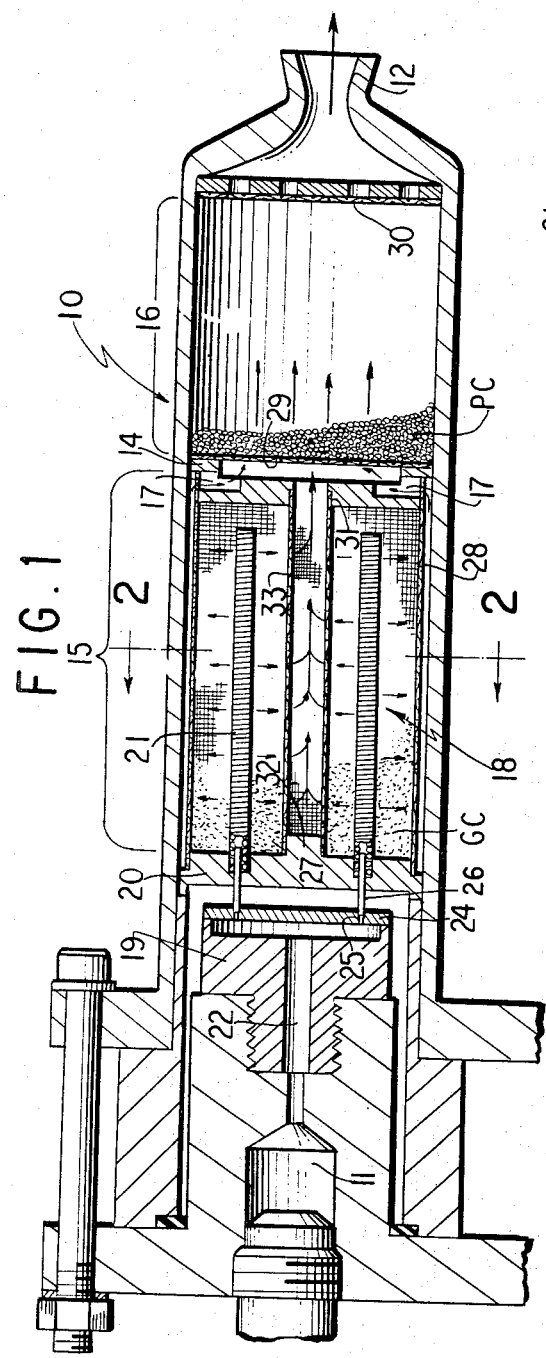
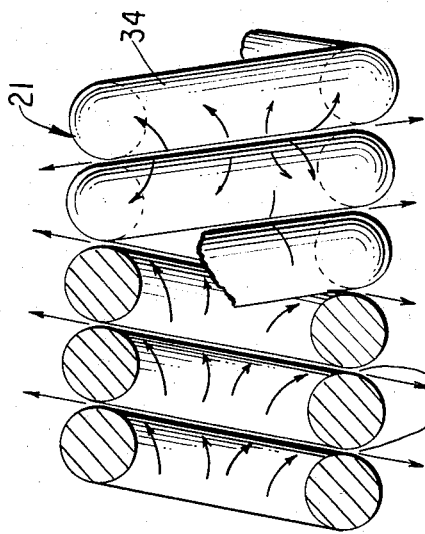
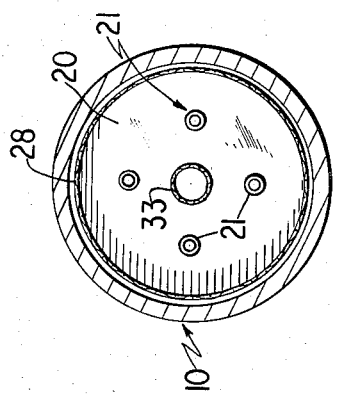
INVENTOR
GARY M. HALL
BY *Ernest A. Joenen*
ATTORNEY

United States Patent Office 3,377,140
Patented Apr. 9, 1968

3,377,140
APPARATUS FOR CATALYTICALLY
DECOMPOSING HYDRAZINE
Gary M. Hall, Clifton, N.J., assignor to Specialties Development Corporation, Belleville, N.J., a corporation of New Jersey
Filed Oct. 15, 1965, Ser. No. 496,330
5 Claims. (Cl. 23—288)

ABSTRACT OF THE DISCLOSURE

Apparatus for catalytically decomposing hydrazine wherein one or more tubes formed of a wire coil are disposed in a bed of catalyst, each tube having flow paths between adjacent convolutions for discharging streams of hydrazine onto a large surface area of catalytic particles adjacent each tube.

---

Hydrazine and its derivatives have been known to be excellent propellants for rocket engines and gas generators, but the techniques utilized for catalytically decomposing such propellants have had certain drawbacks. For example, when the propellant was sprayed upon the face of a pellet catalyst bed on startup, all of the generated spray did not penetrate the bed. This resulted in a collection of propellant at the back of the chamber, which condition caused pressure instability, slow pressure response, long pressure tailoff, and poor impulse repeatability. Also, on startup, the propellant which reached a catalytic surface had to decompose and increase the driving pressure before any additional catalytic surface could be contacted. This process occurred because the spray could not penetrate very far into a pellet catalyst bed. This bootstrap method of buildup in pressure was another reason for poor response characteristics.

Accordingly, an object of the present invention is to overcome the foregoing difficulties by providing improved apparatus for decomposing monopropellants.

Another object is to provide such apparatus which has good performance, repeatability, stability, reliability and response.

A further object is to provide such apparatus which is simple, practical, durable and economical in construction.

Other and further objects and advantages of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects and advantages are generally accomplished by dividing a stream of propellant into a multiplicity of smaller streams, passing the smaller streams through a bed of fine mesh granular catalyst to initiate decomposition, and then passing the effluent of this bed through a bed of pellet catalyst.

It has been found that good response and stability can be attained by introducing the propellant into the granular catalyst bed through multiple distribution tubes buried in the catalyst. These tubes have openings in the side walls thereof to provide further division into smaller streams, for achieving maximum distribution of propellant over the catalyst surface in the minimum amount of time. It also has been found that best performance is attained by providing a maximum number of side wall openings.

An embodiment of the invention has been chosen for purposes of illustration and description, and is shown in the accompanying drawing, forming a part of the specification, wherein:

FIG. 1 is a longitudinal sectional view of a decomposition chamber in accordance with the present invention.

FIG. 2 is a sectional view taken along the line 2—2 on FIG. 1.

FIG. 3 is an enlarged fragmentary view of a preferred distribution tube shown partly in elevation and partly in section.

Referring now to the drawing in detail, there is shown a tubular combustion chamber 10 having a fuel inlet 11 at one end and having a discharge outlet or thrust nozzle at its other end. A partition plate 14 in the chamber divides the chamber into an upstream section 15 and a downstream section 16, and has radially extending openings 17 on its periphery spaced from the inner wall of the chamber to provide fluid flow communication between chamber sections 15 and 16.

A catalyst containing assembly 18 is mounted in the upstream section 15 which includes a multiple stream injector head or manifold means 19, a support plate 20 and a nest, cluster or array of distribution tubes 21 having side wall openings therein and being mounted on the plate 20. The injector head includes an inlet 22 in fluid flow communication with the inlet 11 of the chamber and a face 24 having apertures 25 therein; and tube sections 26 mounted in the apertures 25 and extending through apertures 27 in the plate 20 to connect the injector head to the inlet end of the distribution tubes 21. The tube sections 26 have a smaller outer diameter than the inner diameter of tubes 21 and are arranged to inject propellant into the tubes 21.

The plates 14 and 20, and a tubular screen 28, extending from the plate 20 and across the openings 17 of the plate 14 and spaced from the inner wall of the chamber, serve to confine a bed of fine mesh granular catalyst GC in the upstream chamber section 15. A screen 29 facing the plate 14 and a screen 30 at the outlet end of the chamber serve to confine a bed of pellet catalyst PC in the downstream chamber section 16.

If desired, the plate 14 is formed with a central opening 31, the plate 20 is formed with a central boss 32, and a tubular screen 33 having one end secured to the boss 32 and having its other end secured in the opening 31 can provide an internal flow path for the effluent in addition to the external flow path provided by the screen 28.

As best shown in FIG. 2, the nest of tubes 21 consists of a considerable number of such tubes which are buried in the bed GP. For example, more than one hundred such tubes could be provided although a much lesser number of such tubes might suffice to meet certain design requirements. For the purpose of illustration, only four tubes are shown.

As already indicated, the tubes 21 have side wall openings. Preferably, a multiplicity of such openings are provided which are dimensioned to establish minute flow paths for injecting fuel from the tubes 21 into the bed GC.

In FIG. 3, a tube construction is shown which consists of a wire coil 34 wherein contiguous convolutions of the coil have flow paths 35 between adjacent convolutions. Suitable flow paths 35 are provided by spacing apart adjacent convolutions from about 0.0005 to about 0.01 inch. This construction is advantageous because minute propellant streams can be injected into the bed GC in all radial directions for the entire length of the distribution tubes 21.

Alternatively, the tubes 21 could be porous, perforated, or slotted.

In an actual embodiment of the present invention, eight tubes 21 were annularly arranged in the bed GC which consisted of twenty to thirty mesh catalyst. The bed PC consisted of cylindrical pellets having a length and diameter of 0.125 inch.

Tests were conducted with this apparatus by introducing hydrazine into the injector head under a pressure of 240 p.s.i.g., causing hydrazine to be distributed onto the granular catalyst in the bed GC at a rate of 0.029 pound per second. Response from valve open to 90% thrust was achieved in about 38 milliseconds, and tail-off to 10% thrust took place in about 60 milliseconds with steady state thrust at about 4.3 pounds between response and tail-off. The apparatus had excellent stability and repeatability.

Tests were also conducted with apparatus wherein nineteen tubes 21 were placed in the bed GC but without the screen 33 and the opening 31. In these tests, hydrazine was introduced under a pressure from 100 to 500 p.s.i.g. during pulsing and steady state operation covering flow rates from about 0.01 to 0.05 pound per second. Response to 90% thrust was achieved in about 20 milliseconds, and tail-off to 10% took place in about 40 milliseconds while covering a steady state thrust range of about 2 to 12 pounds between response and tail-off. Here again the apparatus had excellent stability and repeatability.

From the foregoing description, it will be seen that the present invention provides improved apparatus for catalytically decomposing hydrazine.

As various changes may be made in the form, construction and arrangement of the parts herein, without departing from the spirit and scope of the invention and without sacrificing any of its advantages, it is to be understood that all matter herein is to be illustrative and not in any limiting sense.

I claim:

1. Apparatus for catalytically decomposing hydrazine comprising a decomposition chamber means having an inlet for hydrazine propellant and an effluent discharge outlet, catalytic particles substantially filling said chamber means, manifold means in said chamber means and in fluid flow communication with said inlet, a nest of tubes in said chamber means mounted on said manifold means and in fluid flow communication with said manifold means at their upstream end, and each of said tubes being buried in said catalytic particles and spaced from the inner wall of said chamber means, each of said tubes also having flow paths in its side wall arranged for discharge of a plurality of streams of propellant in a plurality of radial directions, an axially extending tubular screen centrally arranged in said nest and having a downstream end in fluid flow communication with said outlet, and a screen in said chamber means between said downstream end and said outlet.

2. Apparatus for catalytically decomposing hydrazine according to claim 1, including axially extending tubular screen means surrounding said nest and having a downstream end in fluid flow communication with said outlet, and catalytic particles substantially filling the space between said tubular screen and said tubular screen means.

3. In apparatus for catalytically decomposing hydrazine, the combination of a decomposition chamber having a hydrazine propellant inlet and an effluent discharge outlet, a partition in said chamber dividing said chamber into an upstream section and a downstream section and having radially extending circumferentially spaced openings providing fluid flow communication between said sections, a nest of tubes having a plurality of minute flow paths in the side wall thereof, said nest being positioned in said upstream chamber section, a tubular screen surrounding said nest and said annular zone and being spaced from the inner wall of said chamber to provide fluid flow communication between said nest and said openings of said partition, manifold means for mounting the tubes of said nest and for conducting propellant from said inlet to the upstream end of the tubes of said nest, said partition including a screen and having a central opening for providing fluid flow communication between said nest and said last mentioned screen, and a second tubular screen centrally arranged in said nest with its downstream end fitted into the central opening of said partition.

4. Apparatus for catalytically decomposing hydrazine comprising decomposition chamber means having an inlet for introducing hydrazine propellant and an effluent discharge outlet, catalytic particles substantially filling said chamber means, and axially extending tube means in fluid flow communication with said inlet at the upstream end and buried in said catalytic particles, said tube means being a wire coil having contiguous convolutions providing flow path means between adjacent convolutions to discharge a plurality of streams of propellant in substantially all radial directions directly onto the particles adjacent said tube means, whereby the propellant is caused to contact a large surface area of catalytic particles adjacent said tube means.

5. Apparatus according to claim 4, wherein said tube means are a cluster of wire coil tubes.

References Cited

UNITED STATES PATENTS

| | | | |
|---|---|---|---|
| 2,483,178 | 9/1949 | Boninger | 23—288 |
| 2,865,721 | 12/1958 | Lane | 60—39.46 |
| 2,961,304 | 11/1960 | Collins | 23—288 |
| 3,091,520 | 5/1963 | Newburn | 60—258 |
| 3,101,589 | 8/1963 | Hamrick | 23—281 |
| 3,135,089 | 6/1964 | Davis | 60—257 |
| 3,167,399 | 1/1965 | Hansen | 23—288 |

MARTIN P. SCHWADRON, *Primary Examiner.*

MARK NEWMAN, *Examiner.*

D. HART, *Assistant Examiner.*